2,700,691

Patented Jan. 25, 1955

2,700,691

INHIBITION OF THE DETERIORATION OF VULCANIZED RUBBER COMPOSITIONS

Carl G. Mayes, Akron, Ohio, assignor to The Firestone Tire & Rubber Company, Akron, Ohio, a corporation of Ohio No Drawing. Application September 20, 1952, Serial No. 310,739

2 Claims. (Cl. 260—810)

This invention relates to inhibitors of the deterioration of vulcanized compositions of natural rubber. The rubber compositions may be those used in tires, inner tubes, foamed rubber products, rubber thread and other rubber articles.

The deterioration of rubber is evidenced in different ways and different tests have been devised to determine the effect of different conditions on rubber compositions. Thus, for example, in pneumatic tires, inner tubes and power-transmitting belts the preservation of the tensile strength of the rubber is important.

It is also important to preserve the white, or nearly white, color of rubber compositions designed for many uses. Thus, in white-sidewall tires and in foamed-latex mattresses, pillows and upholstery padding, the preservation of the light color of the rubber vulcanizate is desirable. The mixture of inhibitors to which this invention relates preserves the rubber with little or no change in its color.

The inhibitor of this invention includes both an alkylated petroleum cresylic acid and a diphenol sulfide. The two components may be used in varying proportions. The two components may be added to the rubber together or separately. A small amount of each material is used, not over several per cent.

The alkyl cresylic acid is a petroleum cresylic acid into which there has been introduced one or more alkyl substituents each containing at least 5 carbon atoms, such as amyl, octyl, alpha-methyl benzyl, etc.

The diphenol sulfide is ordinarily prepared by reacting a phenol with sulfur chloride or sulfur dichloride, with or without sulfur, utilizing at least about one mole of the sulfur chloride for each two moles of the phenol. The phenol groups in each molecule may be the same or different. They may be unsubstituted or they may contain one or more hydrocarbon substituents. They are preferably alkyl substituted. The monosulfides are preferred, and in the following table they alone are named specifically, although it is to be understood that the corresponding disulfides and polysulfides may be used in their stead. The diphenol monosulfides which may be employed include Di(4-hydroxyphenyl)monosulfide
Di(2-hydroxy-5-phenylphenyl)monosulfide
Di(2-hydroxy-5-t-amylphenyl)monosulfide
Di(3,5-dimethyl-4-hydroxyphenyl)monosulfide
Di(3-methyl-4-hydroxy-5-butylphenyl)monosulfide
Di(3-amyl-4-hydroxyphenyl)monosulfide
Di(2-methyl-4-hydroxy-5-butylphenyl)monosulfide
Di(2-methyl-4-hydroxy-5-propylphenyl)monosulfide
Di(3-phenyl-4-hydroxyphenyl)monosulfide
Di(2-methyl-4-hydroxy-5-cyclohexylphenyl)monosulfide
Di(2-hydroxy-3-butyl-6-methylphenyl)monosulfide
Di(2-hydroxy-3-butyl-5-methylphenyl)monosulfide
Di(2-hydroxy-3-t-butyl-5-methylphenyl)monosulfide
Di(2-hydroxy-3-methyl-5-phenylphenyl)monosulfide
Di(2-hydroxy-3,5-di-sec-amylphenyl)monosulfide
Di(2-hydroxy-3-butyl-5,6-dimethylphenyl)monosulfide
Di(2-hydroxy-3-cyclohexyl-5-ethylphenyl)monosulfide In the foregoing, butyl is preferably but not necessarily tert-butyl, and amyl is tert- or sec-amyl. Butyl or amyl may be replaced by tt-octyl, etc. The number of carbons in the hydrocarbon substituents may total twenty or more.

Tests were made in different latex products, aged under different conditions.

An oxygen-absorption test was made on dumbbell specimens from cast latex film as described by J. R. Shelton and Hugh Winn in Industrial and Engineering Chemistry, vol. 38, page 71 (1946); ibid., vol. 40, page 2081 (1948). The latex was compounded according to the following formula:

*Latex film formula*

|  | Dry Weight, parts | Wet Weight, parts |
|---|---|---|
| Hevea latex | 100.0 | 160.0 |
| Potassium hydroxide | 0.6 | 3.0 |
| Ammonium caseinate | 0.5 | 5.0 |
| Sulfur | 1.5 | 3.0 |
| Accelerator | 1.0 | 2.0 |
| Zinc oxide | 3.0 | 7.5 |
| Water | | 5.8 |
| Inhibitor | 1.0 | 2.5 |

(Throughout the specification "parts" means parts by weight.) Films were prepared which contained, respectively, as inhibitor:

1. 1.0 part octylcresylic acid.
2. 1.0 part di(2-hydroxy-3,5-di-sec-amylphenyl)monosulfide.
3. 0.5 part octylcresylic acid+0.5 part of di(4-hydroxyphenyl)monosulfide.

Although the same diphenol sulfide was not used in both Films Nos. 2 and 3, the diphenol sulfides give comparable results, and the films are comparable.

The octylcresylic acid used in the various tests recorded herein was prepared by treating a petroleum cresylic acid with diisobutylene at about 40 to 75° C. in the presence of boron fluoride etherate. Other catalysts such as sulfuric acid, etc. might be used. The reacted mixture was neutralized, as with sodium carbonate solution, and then washed with water. After drying, the alkylated product was distilled to recover compounds boiling above about 140° C. at 10 mm., and to separate these desired materials from lower-boiling compounds which were not alkylated to this extent. The starting material was a petroleum cresylic acid boiling in the range of 195 to 228° C. It was composed essentially of cresols, ethylphenols, xylenols and trimethylphenols, and was substantially free from higher boiling alkylphenols and from phenol.

These films were subjected to the oxygen-absorption test and the rate of oxygen absorption by each was plotted. Slopes were drawn through the points relating to the constant rate of absorption of oxygen, and in this way the rate of oxygen absorption was determined in milliliters per gram of rubber polymer per hour. These rates for Films Nos. 1, 2 and 3 were, respectively, 0.166, 0.094, and 0.077. The film containing the mixed inhibitor absorbed oxygen much less rapidly than either film containing only one component. For instance, after 70 hours the film containing the mixed inhibitor absorbed only 8.6 ml. of oxygen, while the films containing octylcresylic acid and di(2-hydroxy-3,5-di-sec-amylphenyl)-monosulfide reacted with 12.5 and 9.2 ml., respectively. After 80 hours these films had reacted with 10.4, 15.5 and 11.0 ml., respectively. It follows that the film containing the mixed inhibitor will deteriorate less rapidly under conditions in which deterioration is due to reaction with oxygen.

In another test, three latex samples were prepared according to the following formula, and containing, respectively, Sample 1—1.0 part of octylcresylic acid.
Sample 2—1.0 part of di(2-hydroxy-3,5-di-sec-amylphenyl)monosulfide.
Sample 3—0.5 part of octylcresylic acid plus 0.5 part of di(4-hydroxyphenyl)monosulfide.

Although Samples Nos. 2 and 3 contain different diphenol sulfides, they have been found to have substantially the same effect in preventing or inhibiting resinification of foamed latex products in the thermal and sunlight-aging tests described immediately following the next table, and the results of the tests on the respective films may be compared directly, as though the same diphenol sulfide were used in each.

*Foamed latex rubber formula*

|  | Dry Weight, parts | Wet Weight, parts |
|---|---|---|
| Hevea latex | 100.0 | 160.0 |
| Sulfur | 2.0 | 4.0 |
| Potassium oleate | 2.0 | 10.0 |
| Accelerator | 2.5 | 5.5 |
| Sensitizer | 0.5–1.0 | 1.0–2.0 |
| Zinc oxide | 5.0 | 12.5 |
| Sodium silico fluoride | 0.5–1.5 | 1–3 |
| Inhibitor | 1.0 | 2.5 |
| Sufficient water to produce 57% total solids | | variable |

Each latex composition was beaten to a froth in known manner and then poured into a cylindrical mold. The foamed latex was cured 45 minutes at 100° C. in open steam. The vulcanized samples were heat-aged by subjection to circulating air in an oven at 150° C. The samples were inspected from time to time to determine all evidence of melting down and collapsing. The sample containing the mixed inhibitor withstood the test much longer than the samples containing only one of the components.

Other samples of the same three latices were exposed to sunlight behind glass, and evidences of surface resinification or flaking were noted. There was little difference between Samples Nos. 1 and 3, both withstanding this test very well. Sample No. 2 showed evidence of resinification or flaking at a relatively early stage of the test. The diphenol sulfides do not withstand sunlight aging as well as the alkyl cresylic acids. However, it was surprising that the sample containing the mixture, in half quantities, would withstand sunlight aging as well as the sample containing the full portion of alkyl cresylic acids.

An important use of inhibitors is in white-sidewall tires. Many inhibitors which prevent deterioration cause or permit discoloration of the rubber when the tires are in ordinary service. The diphenol sulfides belong to this class. Vulcanizates containing the mixed inhibitor do not discolor, or discolor only very slowly and inhibit or prevent the deterioration of rubber. Tests show that in a white-sidewall test stock the mixed inhibitor reduces the effect of aging on the tensile strength of rubber more than one of the components of the inhibitor alone. The tests were made with a natural rubber stock of the following formula:

| | Parts |
|---|---|
| Rubber | 100 |
| Zinc oxide | 70 |
| Titanium dioxide | 20 |
| Blue coloring | 0.2 |
| Stearic acid | 1.2 |
| Sulfur | 3 |
| Wax | 2 |
| Accelerator | 0.9 |
| Inhibitor | 1 |
| Total | 198.3 |

The stocks were cured 60 minutes at 280° F. and then aged in an oven for 48 hours at 212° F.

The following table gives certain stress-strain data on different rubber stocks of the above formula using different inhibitors, before and after aging, as indicated. Oxygen-absorption tests were made as described by Shelton and Winn, supra, and the rate of reaction with oxygen was determined from slopes prepared as described.

The stocks contained as inhibitors:

Sample A—1.0 part octylcresylic acid.
Sample B—0.5 part octylcresylic acid+0.5 part di(4-hydroxyphenyl)monosulfide.

The results are recorded in the following table:

| Sample | A | B |
|---|---|---|
| Normal tensile | 3,750 | 3,300 |
| Oven-aged tensile | 1,925 | 2,250 |
| Percent tensile retained | 51.4 | 68.2 |
| Oxygen absorption (slopes) | 0.11 | 0.1063 |

(Throughout the specification, tensile strength is measured in pounds per square inch.)

The stock containing the mixed inhibitor retained a higher percentage of its tensile strength on aging than the stock containing only the octylcresylic acid. Experience with diphenol monosulfide alone dictates that the mixture gives better preservation of the physical properties than diphenol monosulfide alone. The slopes of the constant-rate portions of the oxygen-absorption curves show that the rate of oxygen absorption for the stock containing the mixture was much less than for the single component alone.

Similar comparative tests were run on samples containing inhibitor as follows:

Sample A—1.0 part octylcresylic acid.
Sample C—0.5 part octylcresylic acid+0.5 part di(2-hydroxy-3,5-di-sec-amylphenyl)monosulfide.

The results are recorded in the following table:

| Sample | A | C |
|---|---|---|
| Normal tensile | 3,750 | 3,475 |
| Oven-aging | 1,925 | 2,225 |
| Percent tensile retained | 51.4 | 64.2 |

The results show that the mixture of the octylcresylic acid and the di(2-hydroxy-di-3,5-sec-amylphenyl)monosulfide gave much better resistance to thermal decomposition and oxygen absorption than the octylcresylic acid. This diphenol sulfide is a widely used antioxidant and it is evident that the mixed inhibitor gave better protection against deterioration than would be given by the diphenol sulfide under the same conditions.

It was not to be foreseen that the mixed inhibitor would retard the deterioration of rubber to a greater extent than either inhibitor alone, or would give protection as great as that given by the best of the components, under the circumstances presented.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. cyclohexyl benzothiazole sulfenamide, thiazoline sulfenamides, thiocarbamyl sulfenamides, mercaptothiazoles, mercaptothiazolines, thiazolyl mono- and di-sulfides, the dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned where desired, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butyl xanthate, zinc ethyl xanthate, zinc salt of mercaptobenzothiazole, zinc dimethyl dithiocarbamate, and zinc dibutyl dithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

What I claim is:

1. A sulfur-vulcanized composition of natural rubber which includes as an inhibitor of deterioration a small amount of an alkyl cresylic acid and a small amount of a di-hydroxyphenyl monosulfide; the hydroxyphenyl groups of the sulfide being of the class which consists of unsubstituted and hydrocarbon-substituted hydroxyphenyl groups; and the alkyl cresylic acid being formed from a petroleum cresylic acid boiling in the range of 195 to 228° C. and composed essentially of cresols, ethylphenols, xylenols and trimethylphenols, and being substantially free from higher boiling alkyl phenols and from phenol, and alkylated by reaction with diisobutylene at substantially 40 to 75° C. in the presence of a catalyst.

2. The process of vulcanization which comprises sulfur-vulcanizing natural rubber which contains as an inhibitor of deterioration a small amount of an alkyl cresylic acid and a small amount of a di-hydroxyphenyl monosulfide; the hydroxyphenyl groups of the sulfide being of the class which consists of unsubstituted and hydrocarbon-substituted hydroxyphenyl groups; and the alkyl cresylic acid being formed from a petroleum cresylic acid boiling in the range of 195 to 228° C. and composed essentially of cresols, ethylphenols, xylenols and trimethylphenols, and being substantially free from higher boiling alkyl phenols and from phenol, and alkylated by reaction with diisobutylene at substantially 40 to 75° C. in the presence of a catalyst.

References Cited in the file of this patent

UNITED STATES PATENTS

| | | |
|---|---|---|
| 2,356,929 | Hart | Aug. 29, 1944 |
| 2,364,338 | Beaver | Dec. 5, 1944 |
| 2,565,998 | Swaney et al. | Aug. 28, 1951 |